Figure 1:
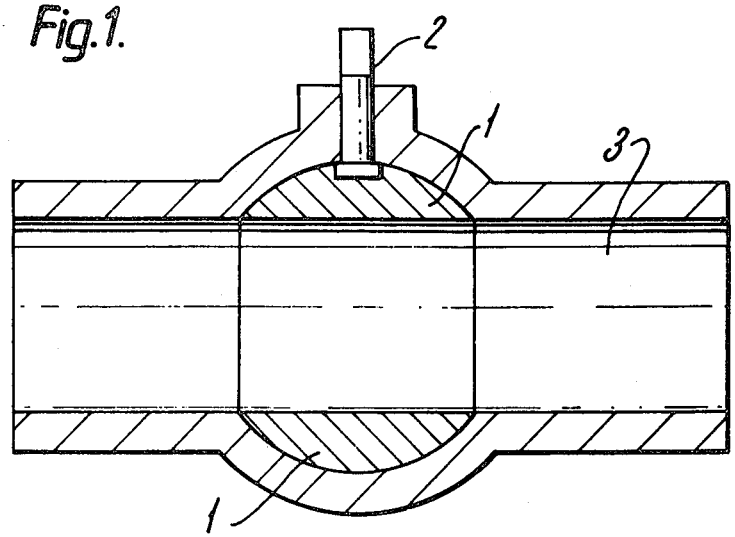

United States Patent [19]

Hurst et al.

[11] Patent Number: 4,468,559

[45] Date of Patent: Aug. 28, 1984

[54] DETERMINING VALVE POSITION

[75] Inventors: James A. Hurst; Peter Jackson, both of Stockton-On-Tees, England

[73] Assignee: Imperial Chemical Industries, PLC, London, England

[21] Appl. No.: 366,349

[22] Filed: Apr. 7, 1982

[30] Foreign Application Priority Data

Apr. 15, 1981 [GB] United Kingdom ............... 8112006
May 19, 1981 [GB] United Kingdom ............... 8115254
Feb. 1, 1982 [GB] United Kingdom ............... 8202857

[51] Int. Cl.$^3$ ..................... G21H 5/02; F16K 37/00
[52] U.S. Cl. ............................. 250/303; 137/554; 340/686
[58] Field of Search ............ 250/303, 497, 498, 302; 116/277; 340/671, 686; 137/554; 324/175

[56] References Cited

U.S. PATENT DOCUMENTS

| | | | |
|---|---|---|---|
| 2,750,583 | 6/1956 | McCullough | 250/302 X |
| 3,128,386 | 4/1964 | Hughes | 340/671 X |
| 3,381,550 | 5/1968 | Smith | 250/303 X |
| 3,602,254 | 8/1971 | Fawkes | 137/554 |
| 4,093,000 | 6/1978 | Poff | 137/554 |

FOREIGN PATENT DOCUMENTS 1956534 6/1970 Fed. Rep. of Germany.
1586381 2/1970 France.

Primary Examiner—Alfred E. Smith
Assistant Examiner—Jack I. Berman
Attorney, Agent, or Firm—Cushman, Darby & Cushman

[57] ABSTRACT

A method and apparatus for determining the position of a valve for example ball valves, plug valves, gate valves using a source of radiation such as cesium-137 located either on or adjacent to the external surface of the valve or within the valve itself, for example in the ball of a ball valve, and a radiation detector such as a Geiger-Müller tube on the external surface of the valve. Source and detector are aligned and located relative to one another so that the count rate detected is indicative of the valve position. The method is accurate and, for example, allows the position of the ball in a ball valve to be monitored to within ±1 mm.

12 Claims, 6 Drawing Figures

DETERMINING VALVE POSITION

The present invention relates to a method and apparatus for monitoring the position of various types of valves.

Many types of valves are now used in industry, for example ball valves, plug valves, gate valves, butterfly valves. Each type of valve has its own particular characteristics and applications and a large industrial plant may contain examples of several different types of valve. The operators of an industrial plant will need to know the position of the various valves in the plant so that they can make adjustments to such things as the plant operating conditions: that is, from time to time they will need to know whether any particular valve is open or shut or in some cases if it is partially open and, if so, the degree of opening of the valve. Various means have been devised to provide plant operators with an indication of the position of the various valves in the plant and these generally work well. However, difficulties do arise from time to time and when they do the operator may no longer have a reliable guide to the exact position of the valve in question. This is clearly unsatisfactory and in some cases could be dangerous. An illustration of the difficulties that can arise is provided by ball valves.

Ball valves are used widely in industry and many types and sizes are available. In the main, ball valve design is well established and the valves operate satisfactorily for long periods without any need for supervision of their condition. However, occasional problems do occur, especially with large ball valves, one such problem being that the spindle of larger ball valves tends to twist with respect to the ball. Larger ball valves are fitted with a spindle position indicator but twisting of the spindle will mean that the spindle position indicator may show that the valve is fully open or closed when in fact this is not the case. This, of course, could cause difficulties in the operation of the plant or equipment of which the ball valve is a part and in certain circumstances could be a direct cause of dangerous conditions arising in the said plant or equipment, for example where the ball valve is used to seal against fluid at pressure. Thus the method of monitoring a ball valve using the spindle position indication is not reliable and in some circumstances may be hazardous.

Other types of valve are also subject from time to time to damage or distortion or some other effect which may mean that the plant or equipment operator is unable to determine accurately and with certainty what the valve position is. There is a need, therefore, for a more reliable method than those used hitherto for determining valve position and we have now devised a method and apparatus for determining the position of a number of types of valve including ball valves, plug valves, gate valves and butterfly valves. A further need is for a reliable method for monitoring the position of valves which are positioned in remote locations, for example hydraulically or pneumatically operated valves in pipelines running across open country.

According to the present invention a method for determining the position of a valve comprises locating a source of radiation either on or adjacent to an external surface of the valve or within the valve and monitoring the radiation from the source with a detector therefor located on or adjacent to the external surface of the valve, the relative position and alignment of the source and detector being so chosen that the count rate detected by the detector is indicative of the position of the valve.

Preferably the radioactive source is housed either within the valve or in a shielded container located on the external surface of the valve and the detector is preferably housed on the external surface of the valve.

In one preferred embodiment of the invention the radioactive source is located on the stem of the valve so that, as the position of the moving part changes, the count rate detected by the detector changes correspondingly. A suitable calibration chart or diagram etc can thus be readily prepared so that the position of the valve can be determined rapidly and accurately at any time from the observed count-rate. Alternatively, in other embodiments, the fully closed and/or fully open positions can be determined from the strength of radiation detected by the detector.

In a section preferred embodiment of the invention the radioactive source is located on or adjacent to the external surface of the valve. In this embodiment the source and detector are located relative to one another so that interruption of the beam of radiation by the moving part of the valve provides an indication that the valve is closed or, in some cases for example butterfly valves, open.

In a further preferred embodiment of the invention, the valve is a ball valve and the radioactive source is located on or adjacent to the external surface of the valve, the source being so positioned that radiation is directed through the valve, and the relative positions and alignment of the source and detector are so chosen that the detector receives (a) a maximum amount of radiation when the valve is fully closed and, (b) a less than maximum amount of radiation whenever the valve is not fully closed.

In this embodiment the radioactive source is conveniently housed in a shielded container located on the external surface of the ball valve and the detector is also housed on the external surface. It is preferred that the source and detector are so aligned on substantially opposite sides of the ball valve that when the valve is fully closed the beam of radiation passes through the fluid in the orifice of the ball, just skimming the metal edge of the said orifice. The count-rate is then at a maximum. When the source and detector are so aligned, even a very slight deviation from the fully closed position of the ball valve will cause the metal edge of the orifice of the ball to impinge on the beam of radiation thus reducing the count-rate and, if desired, setting off an alarm. In an alternative embodiment, an alarm or other indication can be arranged to give a "warning" only when the valve is in the desired fully closed position.

In another embodiment of the invention in which the valve is a ball valve, it is preferred that the radioactive source be housed in a cavity in the ball near the outer surface thereof. It is preferred that the source should be located not on the outer surface itself but at a position slightly inset from said surface. Preferably, the radiation detector is so aligned with the source position that, when the valve is either fully open or fully closed (whichever position is being monitored), the radioactive emission causes a maximum count-rate to be recorded by the detector.

It is convenient, especially if the valve is located in a remote position (as in pipeline use), for the count-rate recorded by the detector to be transmitted to a control position. If required, an alarm can be arranged to respond to the count rate either to indicate when the count-rate is not up to a pre-set value (and the valve is therefore not fully open or closed, as the case may be) or to indicate when the count rate has reached the value indicating that the valve is fully open or closed.

If desired, this embodiment of the invention may be adapted to indicate both the open and closed positions of a ball valve. In this preferred embodiment, two radiation detectors are used and are so positioned external to the valve and relative to the radioactive source that (a) when the valve is fully open a predetermined, preferably a maximum, count rate is recorded by the first-detector; and (b) when the valve is fully closed a predetermined, preferably a maximum, count rate is recorded by the second detector.

Any convenient radioactive source, preferably of long half-life, may be used, for example cesium-137, cobalt-60.

The radiation detector is preferably a Geiger-Müller detector. Alternatively the radiation detector may comprise a scintillation counter.

According to a further aspect of the present invention, apparatus for determining the position of a valve comprises in operative combination a radioactive source located either on or adjacent to the external surface of the valve or within the valve and a radiation detector located on or adjacent to the external surface of the valve, the relative positions of the source and detector being such that the count-rate detected by the detector is indicative of the position of the valve.

Preferably apparatus according to this invention comprises apparatus for indicating the position of the ball in a ball valve comprising in operative combination a radioactive source housed in the ball of the ball valve and a radiation detector located on the outer surface of the valve, the relative positions of source and detector being such that a predetermined count-rate is recorded by the detector when the ball valve is either fully open or fully closed.

In a further preferred embodiment apparatus according to this invention comprises in operative combination a radioactive source located on or adjacent to the external surface of a ball valve in such a position that radiation is directed through the valve and a radiation detector located on or adjacent to the external surface of the valve, the relative positions and alignment of the source and detector being such that the detector receives (a) a maximum amount of radiation when the valve is closed; and (b) a less than maximum amount of radiation whenever the valve is not fully closed.

Preferably in this embodiment the source and detector are aligned on substantially opposite sides of the valve in positions such that when the valve is fully closed the beam of radiation passes through the fluid in the orifice of the ball, just skimming the metal edge of the said orifice.

Figure 2:
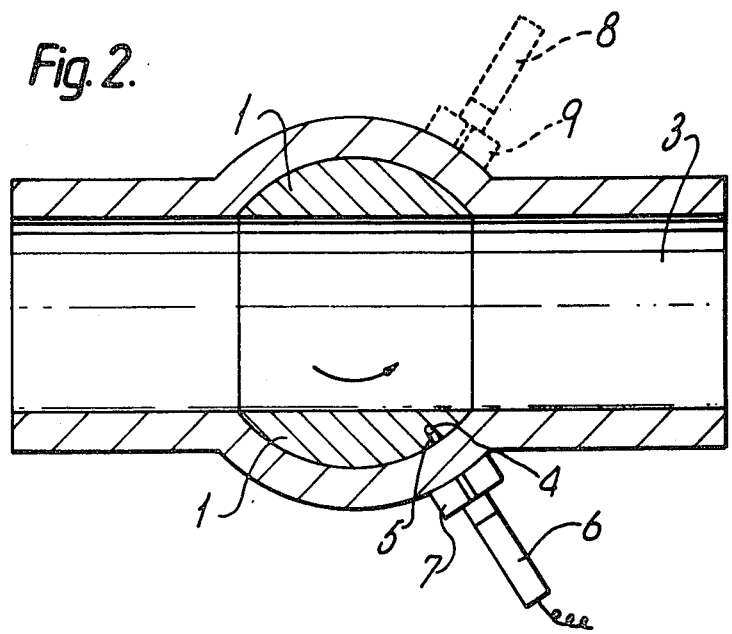

Embodiments of the present invention are hereinafter described in further detail with reference to the accompanying drawings in which FIG. 1 is an elevation on centre line section and FIG. 2 is a plan view on centre line section of a ball valve in a pipeline.

Figure 3:
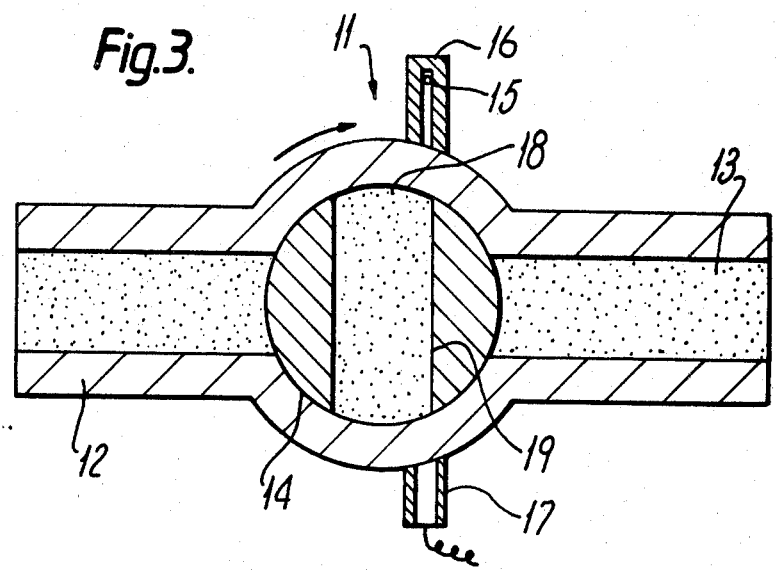

FIG. 3 is a plan view on centre line section of a ball valve in a pipeline.

Figure 4A:
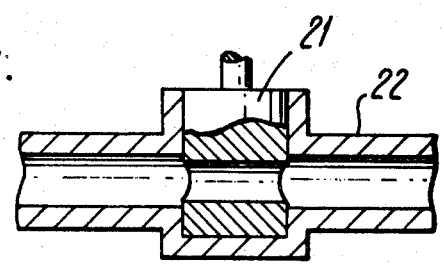
Figure 4B:
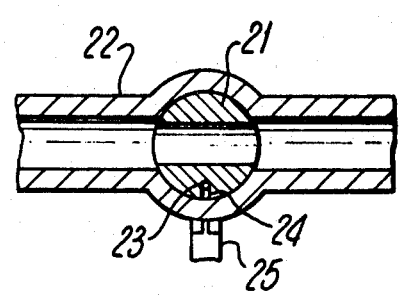
Figure 5A:
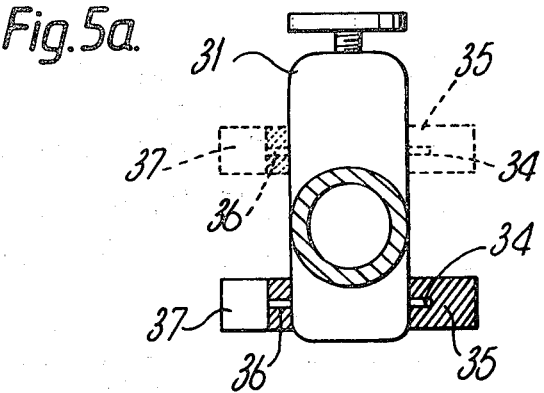
Figure 5B:
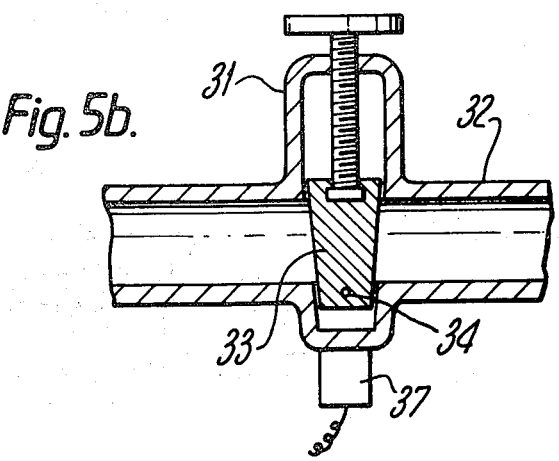
Figure 6:
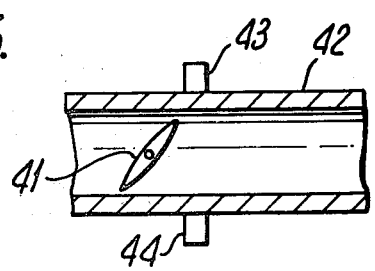

FIGS. 4(a) and 4(b) are respectively an elevation on centre line section and a plan view on centre line section of a plug valve in a pipeline;

FIGS. 5(a) and 5(b) are respectively an end elevation and an elevation on centre line section of a wedge gate valve in a pipeline; and FIG. 6 is a plan view on centre line section of a butterfly valve in a pipeline.

Referring to FIGS. 1 and 2, the ball valve comprises the usual ball 1 and spindle 2 housed in a pipeline 3. A cesium-137 radioactive source 4 is housed in a drilled pocket 5 adjacent to the outer surface of the ball. A scintillation detector 6 with collimator 7 is aligned with the source 4 so that when the ball valve is fully open (as shown in the drawings) the detector will record a pre-set count-rate.

The position of an optional section scintillation counter 8 and collimator 9 are shown in dotted outline on FIG. 2 and these may be provided, if desired, so as to monitor the ball when the valve is fully shut.

Both scintillation counters 6 and 8 are connected to a distant control room (not shown) and to alarms therein, the alarms being set so that they indicate only when the valve is fully open or fully closed respectively.

The method and apparatus of this embodiment of the present invention enable process, plant and pipeline operators and the like to monitor the exact position of the ball in ball valves without any need to use the unreliable conventional spindle position indicator. For valves of 15 cm (6 inches) diameter and larger it is believed that this embodiment allows the ball position to be monitored to within ±1 mm.

Referring to FIG. 3 of the drawings, a ball valve, indicated generally by a number 11, in a pipeline 12 conveying a liquid or gas 13 is shown in the fully closed position. The direction of movement of the ball 14 is shown by the arrow. A cesium-137 source of radiation 15 is located in a shielded container 16 on the external surface of pipeline 12. A detector 17 for the radiation is located on the external surface of the pipeline 12 opposite the source 15. The source 15 and detector 17 are collimated so that in the fully closed position of the ball valve (as shown) the radiation from the source 15 passes through the fluid in the orifice 18 of the ball valve, the radiation just skimming but not impinging on the inner wall 19 of the orifice.

In use, the ball valve is usually open and the metal of the ball 14 will impede the radiation. The count at the detector will be relatively low. As the ball valve is closed the count-rate will increase and will reach a maximum when the valve is fully closed. If desired, an alarm or other indication (not shown) can be connected to detector 17 and can be arranged to indicate the valve is fully closed.

By monitoring the position of the ball rather than the spindle of the valve the method of this invention provides the operator with a more reliable indication of the closure of the valve. The method is applicable in the many areas in which ball valves are used, for example pipelines and including both those pipelines which are readily accessible and those which are located in more remote areas.

When the ball valve with its associated radioactive source and detector are first installed, the unit is calibrated and the maximum count-rate determined for that valve and source. The value of maximum count-rate will decrease slowly with time but by using a source of long half-life, the decrease is readily calculated, and the equipment can be adjusted, automatically if desired, to take account of the decrease. Thus where an alarm forms part of the equipment, the decrease in maximum count will not cause it to give false alarms or to fail when it should give an alarm.

Referring to FIG. 4 a plug valve 21 in a pipeline 22 has a cesium-137 radioactive source 23 housed in a drilled pocket adjacent to the outer surface of the plug. A radiation detector, for example a Geiger-Müller or scintillation detector 25 is aligned with the source 23 so that when the plug valve is fully open (as shown in the drawing) the detector will record a high, predetermined, level of radiation from the source. If the valve is closed or is only partially open the count-rate will be appreciably lower.

Referring to FIG. 5 a wedge gate valve 31 in a pipeline 32 has a wedge 33. FIG. 5(a) shows possible locations for the radioactive source and detector. A radioactive source 34 of cesium-137 is housed outside the valve in a housing 35. On the opposite side of the valve 31 from the source 34 are a collimator 36 and radiation detector 37 aligned with the source. If only the lower source and detector (full lines in the drawing) are used, then only the fully closed position can be detected. If only the upper source and detector (dotted lines in the drawing) are used, then only the fully open position can be detected. In this arrangment, the source and detector are aligned so that, when the valve is fully open, the wedge just clears the beam of radiation. Alternatively, both the upper and lower sources and detectors can be used so that both fully closed and fully open positions can be detected.

In FIG. 5(b) the radioactive source 34 is shown in an alternative location in the wedge 33 of the valve and the detector 37 is mounted externally below the source. In this case the position of the valve at any time can be determined from the reading obtained by the detector by use of the inverse square law.

In a further alternative arrangement the source can be mounted in the wedge 33 as in FIG. 5(b) with detectors 37 located as in FIG. 5(a). In use, as the wedge gate valve is opened and closed, so the count-rate recorded by the detector will change. In the embodiment shown in FIG. 5(b) by suitable initial calibration of count-rate against wedge position, the position of the valve thereafter can be determined very quickly and accurately from the recorded count-rate. Repeated experiments using the embodiment shown in FIG. 5(a) with a six-inch wedge gate valve have shown that the position of the wedge can be located using the method of the invention to within ±1 mm.

Referring to FIG. 6 a butterfly valve 41 is shown positioned in a pipeline 42. A cesium-137 radioactive source 43 is mounted on one external wall of the pipeline 42 and a scintillation detector 44 is located externally on the opposite wall. The source and detector are so positioned that one flap of the butterfly valve 41 just interrupts the radiation beam when the valve is in the open position.

The method and apparatus of this invention allow rapid and accurate monitoring of the position of various types of valves. By suitable electrical/electronic connections, the positions of valves in remote locations can be readily monitored at a distant control centre. As hereinbefore described, when the valve with its associated radioactive source and detector are first installed, the unit is calibrated. The count-rate detected for any valve position will decrease slowly with time, of course, but by using a source of long half-life, the decrease is readily calculated and the equipment can be adjusted, automatically if desired, to take account of the decrease.

We claim:

1. A method for determining the position of a valve comprises locating a radioactive source proximally of a valve and monitoring radiation from the source with a detector therefor located proximally of an external surface of the valve, the relative position and alignment of the source and detector being so chosen that the count rate detected by the detector is indicative of the position of the valve.

2. A method as claimed in claim 1 in which the radioactive source is housed within the valve and the detector is housed on the external surface of the valve.

3. A method as claimed in claim 1 in which the radioactive source is located on the valve stem.

4. A method as claimed in claim 1 for determining the position of a ball valve in which the radioactive source is located proximally of the external surface of the valve, the source being so positioned that radiation is directed through the valve, and the relative positions and alignment of the source and detector are so chosen that the detector receives
   (a) a maximum amount of radiation when the valve is in the fully closed position, and
   (b) a less than maximum amount of radiation whenever the valve is not fully closed.

5. A method as claimed in claim 1 for determining the position of a ball valve in which the radioactive source is housed in a cavity in the ball near the outer surface thereof at a position slightly inset from said surface, the source and detector being so positioned and aligned that a maximum count rate is recorded by the detector when the valve is in either the fully open or fully closed position.

6. A method as claimed in claim 5 in which two radiation detectors are used and are so positioned external to the valve and relative to the radioactive source that
   (a) when the valve is fully open a predetermined, count rate is recorded by the first detector; and
   (b) when the valve is fully closed a predetermined count rate is recorded by the second detector.

7. A method as claimed in claim 6, wherein when the valve is fully open a maximum count rate is recorded by the first detector and when the valve is fully closed a maximum count rate is recorded by the second detector.

8. Apparatus for determining the position of a valve which comprises in operative combination a radioactive source located proximally of a valve and a radiation detector located proximally of an external surface of the valve, the relative positions of the source and detector being such that the count-rate detected by the detector is indicative of the position of the valve.

9. Apparatus as claimed in claim 8 for indicating the position of a ball in a ball valve and comprising in operative combination a radioactive source housed in the ball of the ball valve and a radiation detector located on the outer surface of the valve, the relative positions of source and detector being such that a predetermined count-rate is recorded by the detector when the ball valve is either fully open or fully closed.

10. Apparatus as claimed in claim 8 and comprising in operative combination a radioactive source located proximally of the external surface of a ball valve in such a position that radiation is directed through the valve and a radiation detector located proximally of the external surface of the valve, the relative positions and alignment of the source and detector being such that the detector receives
 (a) a maximum amount of radiation when the valve is in the fully closed position, and
 (b) a less than maximum amount of radiation whenever the valve is not fully closed.

11. Apparatus as claimed in claim 10 in which the source and detector are aligned on substantially opposite sides of the valve in positions such that when the valve is fully closed the beam of radiation passes through the fluid in the orifice of the ball and just skims the metal edge of the said orifice.

12. A method as claimed in claim 1 in which the radioactive source is housed in a shielded container located on the external surface of the valve and the detector is housed on the external surface of the valve.

* * * * *